July 25, 1961 D. E. GRIFFIN 2,993,566
SEPARATION OF ACETYLENE
Filed June 24, 1959
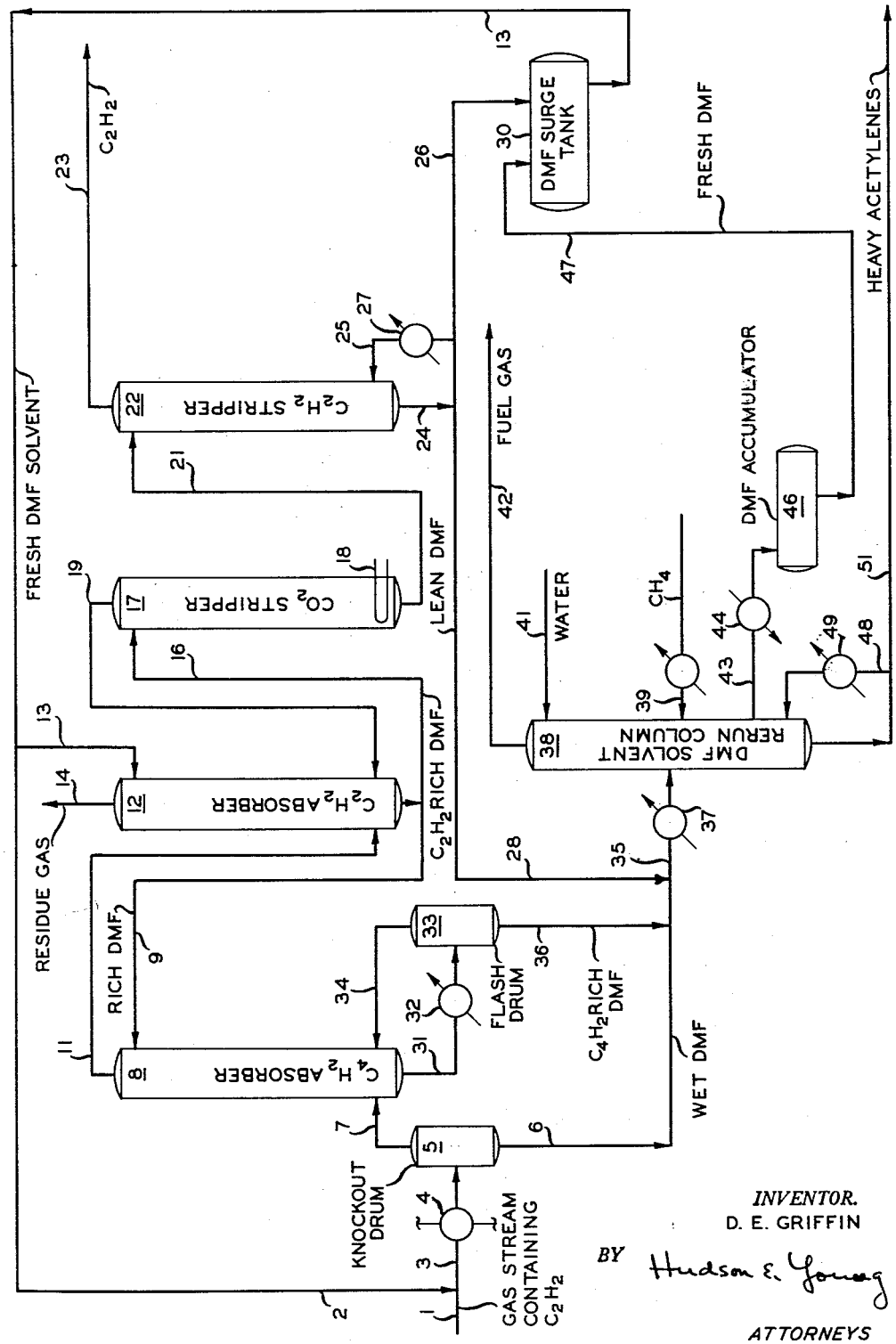
INVENTOR.
D. E. GRIFFIN
BY Hudson E. Young
ATTORNEYS United States Patent Office 2,993,566
Patented July 25, 1961

2,993,566
SEPARATION OF ACETYLENE
Donald E. Griffin, Bartlesville, Okla., assignor to Phillips Petroleum Company, a corporation of Delaware
Filed June 24, 1959, Ser. No. 822,673
6 Claims. (Cl. 183—115)

This invention relates to the manufacture of acetylene. In one aspect, it relates to the dehydration of gases containing acetylene. In another aspect, it relates to an improved process for removing water and heavy acetylenes, such as diacetylene, from gases containing acetylene, using a selective solvent, such as dimethylformamide, and the purification of said solvent. In a further aspect, it relates to the purification of a selective solvent used in a low-temperature process for removing water and heavy acetylenes from gases containing acetylene produced by thermal cracking of low-molecular weight, normally gaseous hydrocarbons.

In recent years, increased demand for commercial acetylene has resulted in considerable effort directed toward its production by high temperature cracking of low molecular weight, normally gaseous hydrocarbons, such as methane, ethane, propane, butane, natural gas, and the like, in a thermal-cracking furnace. Normally, the hot furnace or reactor effluent gases, containing acetylene and other low molecular weight cracked gases, are subjected to quenching operations to cool the gases and remove undesirable components such as tars, aromatics, carbon black, and other impurities. Following the quenching operation, the quenched gases contain acetylene, higher acetylenes such as diacetylene, water, carbon dioxide, and impurities such as cracked olefinic gases.

Heretofore, it has been the practice in many acetylene processes to remove the water from the quenched gases by passing the gases through beds of desiccant. While this type of dehydration is generally satisfactory, it has some drawback in that the desiccant has to be periodically regenerated; also some of the cracked olefinic gases have a tendency to polymerize on contact with the desiccant, thereby further reducing the useful life of the desiccant beds.

The heavy acetylenes, such as diacetylene, have often been removed heretofore from the cracked gases by employing a solvent (e.g., oil) different from the solvent used in the main acetylene absorption step, thus requiring another item of equipment which adds to the cost of installation and operation.

In other processes, the water and heavy acetylenes, such as diacetylene, are removed relatively late in the purification train, thus requiring larger quantities of solvent for the acetylene absorption step, and requiring relatively higher purification and recovery process temperatures which necessarily reduce the selectivity of the solvent for acetylene.

Accordingly, the object of this invention is to provide an improved process for the purification of low molecular weight cracked gases, such as acetylene, obtained from a thermal-cracking operation. Another object is to dehydrate cracked gases containing low molecular gases such as acetylene, and removing heavier acetylenes, such as diacetylene, therefrom by employing a minor amount of the same selective solvent used in the main acetylene absorption step. Another object is to dehydrate relatively tar-free, low molecular weight cracked gases early in the purification train. Another object is to remove heavy acetylenes, such as hazardous diacetylene, from low molecular weight cracked gases early in the purification train. Another object is to purify the selective solvent used in dehydrating low molecular weight cracked gases and used in removing diacetylene, and to maintain desired purity of entire solvent stream by means of a single solvent purification step. Further objects and advantages of this invention will become apparent to those skilled in the art from the following discussion, appended claims, and the flow sheet of the accompanying drawing which illustrates the subject invention. It is to be understood that in the following discussion and accompanying drawing only sufficient pieces of various types of equipment such as vessels, columns, pipes, pumps, heat exchangers, etc., will be discussed and have been shown in the interest of brevity to permit a ready understanding of the subject invention.

Referring now to the flow sheet of the accompanying drawing, a stream 1 from a pyrolysis operation comprising relatively tar-free, quenched, low molecular weight cracked hydrocarbon gases, including acetylene in minor quantities, having a temperature of about 32 to 100° F., and a stream 2 of fresh selective solvent, such as dimethylformamide (abbreviated as DMF in the drawing), are passed via line 3 to a refrigeration unit 4 wherein the gas-liquid mixture is cooled, for example, to a temperature of —20 to 20° F. The amount of selective solvent used at this point will be sufficient to dehydrate the gas stream; this will amount to about 0.25 mol percent of the selective solvent used in the main acetylene absorption step, or 0.6 to 2 mols of solvent per mol of water in the gas stream 1. This selective solvent 2 will preferentially absorb the water present in the gas stream 1. The cooled gas-liquid mixture is passed via line 3 into a gas-liquid separation zone 5, such as a knockout drum, wherein the wet solvent having substantially all the water absorbed therein is separated from the gas stream. The wet solvent bottoms are withdrawn from knockout drum 5 via line 6, and the dehydrated gas stream is taken off as overhead via line 7. The dehydrated gas stream is introduced at the lower end of an absorption tower 8 wherein substantially all of the diacetylene, and minor amounts of other low molecular weight higher acetylenes, such as vinylacetylene, are preferentially absorbed and removed. The absorption of the diacetylene in absorption tower 8 is accomplished by contacting the gas stream with acetylene rich selective solvent which is supplied to the upper portion of the absorption tower via line 9. The amount of the rich solvent used at this point will be sufficient to remove substantially all of the diacetylene from the dehydrated gas stream; generally this will amount to about 1.40 mol percent of the total acetylene rich solvent, or 3 to 20 mols of the rich solvent per mol of diacetylene in the dehydrated gas stream.

The absorption tower 8 preferably contains contact surface material such as baffles, rings, beads, etc., to cause intimate contact of the gases fed thereto with the rich selective solvent. Since water has been removed from the gas, this absorption step can be carried out at relatively low temperature, e.g., —20 to 20° F., and at atmospheric or slightly superatmospheric pressure, e.g., 14.7 to 50 p.s.i.a.

The dehydrated, diacetylene-free gas stream, containing substantially all of the acetylene, is removed from absorption tower 8 as overhead via line 11 and passed to the lower end of an acetylene absorption tower 12, which can contain suitable contact surface material, wherein the gas stream is contacted with fresh selective solvent supplied to the upper end of absorber 12 via line 13, the non-absorbed residue gas being withdrawn as overhead from the top of the tower via line 14. The acetylene, and minor amounts of heavier acetylenes, absorbed in the solvent are removed as bottoms via line 16 and pumped to the upper end of a carbon dioxide stripping tower 17, a small portion of the rich solvent bottoms being pumped via line 9 to the upper end of the diacetylene absorber 8. Heating means 18 disposed in the lower end of the carbon dioxide stripper causes stripping of carbon dioxide from the acetylene-rich solvent mixture, the $CO_2$ residue gas being withdrawn as overhead via line 19 and passed back to acetylene absorber 12. The carbon dioxide stripper 17 can be operated at suitable temperature and pressure; for example, the lower end of the stripper can be operated at a temperature 218° F., and the upper end operated at a temperature of 140° F. and 20 p.s.i.a. The acetylene-rich solvent is withdrawn as bottom from the lower end of stripper 17 and is pumped via line 21 to the upper end of an acetylene stripper 22 wherein acetylene is stripped from the solvent and conveyed as overhead via line 23 to suitable absorption equipment for the removal of heavier acetylenes therefrom. The acetylene-free lean solvent, containing some heavy acetylenes as impurities, is withdrawn as bottoms from stripper 22 via line 24, a portion of this stream being recycled via line 25, having an external reboiler means 27 associated therewith, to the stripper. The acetylene stripper 22 can be operated at suitable temperatures and pressures, for example, the lower end of the stripper can be operated at a temperature of 326° F., and the upper end operated at a temperature of 250° and 20 p.s.i.a. The major portion of the lean solvent bottoms is pumped via line 26 to a solvent surge tank 30, from which the major portion is pumped via line 13 to the upper end of the acetylene absorber 12. A minor proportion of the lean solvent from stripper 22 is also pumped via line 28 for mixture with other solvent process streams so as to control and maintain the purity of the selective solvent used in the process. This minor amount of lean solvent will generally be about 0.32 mol percent of the lean solvent sent to surge tank 30, or 0.5 to 4 weight percent of the selective solvent used in the main acetylene absorption step.

Purification of the solvent will now be discussed, reference being made to the diacetylene absorber 8. The bottoms from this absorber 8, comprising solvent containing diacetylene, some heavy acetylenes, a small amount of acetylene, and water, is removed as bottoms via line 31 and pumped to a heat exchanger 32 whereby the bottoms are heated at a temperature sufficient to enable the small amount of acetylene to be flashed from the bottoms without at the same time flashing any substantial amount of the heavier acetylenes dissolved in the solvent; for example, the bottoms pumped from absorber 8 via line 31 are heated to a temperature within the range of 120 to 180° F., preferably about 158° F. The heated bottoms are then flashed in flash drum 33, the flash drum being operated at atmospheric or slightly superatmospheric pressure, e.g., 14.7 to 50 p.s.i.a., and at a temperature of about 150° F. The acetylene containing overhead is passed back to the lower end of the diacetylene absorber 8 via line 34, and the diacetylene rich solvent bottoms removed from the flash drum 33 via line 36. Alternatively, the small amount of acetylene absorbed in the solvent bottoms removed from diacetylene absorber 8 can be recovered in substantial quantities from the bottoms by adding sufficient water to displace the acetylene from the solvent mixture.

The wet solvent withdrawn from knockout drum 5 via line 6 is combined with the diacetylene rich solvent bottoms in line 36 from flash drum 33 and also combined with small amount of lean solvent withdrawn from the acetylene stripper 22 via lines 24, 28. This combined stream is conveyed via line 35 and heated by heat exchanger 37, e.g., to a temperature of 100 to 200° F., and introduced intermediate the ends of a solvent rerun or recovery column 38.

The rerun column 38 can contain suitable liquid-gas contacting material, such as Raschig rings, bubble or valve trays, and the like, and this rerun column is operated so as to have a temperature gradient; for example, the lower end of the rerun column 38 can be operated at a temperature about the bubble point of the kettle product, e.g., 300 to 400° F., and the upper end operated at the dew point of the residue gas, e.g., 80 to 150° F., this rerun column being preferably operated at atmospheric pressure. An inert gas, such as methane, is introduced via line 39 at an intermediate level in rerun column 38, this inert gas aiding in stripping the diacetylene by decreasing its partial pressure. Other inert gases which can be used in aiding the stripping include nitrogen, natural gas, residue gas from the acetylene absorber, or the like. The small amount of solvent which is in the overhead gas can be contacted with water supplied via line 41 to the upper end of the tower, the fuel gas overhead, containing water vapor and diacetylene, being withdrawn as overhead via line 42.

The purified or fresh solvent vapor is withdrawn from the bottom portion of the rerun column 38 via line 43 and this solvent vapor is cooled by means of cooling means 44 and conveyed to a solvent accumulator tank 46, the cooled, condensed and purified solvent being pumped from the accumulator to the solvent surge tank 30 via line 47. The kettle product from the solvent rerun column 38 is withdrawn via line 48, having an external reboiler means 49 associated therewith, and recycled to the bottom of the tower. Any accumulation of heavy acetylenes can be withdrawn periodically via line 51.

The following material balance further illustrates subject invention.

TABLE I

*Material balance—mols per hour*

| Stream Component | 1 | 2 | 7 | 6 | 9 | 11 | 31 | 34 | 36 | 28 | 35 | 41 | 39 | 42 | 43 |
|---|---|---|---|---|---|---|---|---|---|---|---|---|---|---|---|
| CO | 122.8 | | 122.8 | | | 122.8 | | | | | | | | | |
| $CO_2$ | 164.2 | | 164.2 | | 0.24 | 164.37 | 0.28 | 0.21 | 0.07 | | 0.07 | | | 0.07 | |
| $N_2$ | 24.8 | | 24.8 | | | 24.8 | | | | | | | | | |
| $H_2$ | 475.8 | | 475.8 | | | 475.8 | | | | | | | | | |
| $CH_4$ | 54.4 | | 54.4 | | | 54.4 | | | | | | | 157.40 | 157.40 | |
| $C_2H_2$ | 123.7 | | 123.58 | 0.12 | 1.91 | 124.37 | 1.88 | 0.76 | 1.12 | | 1.24 | | | 1.24 | |
| $C_2H_4$ | 16.9 | | 16.9 | | 0.06 | 16.96 | | | | | | | | | |
| $C_3H_4$ | 1.0 | | 1.0 | | 0.01 | 0.98 | 0.04 | 0.1 | 0.03 | | 0.03 | | | 0.03 | |
| $C_4H_2$ | 4.0 | | 4.0 | | 0.01 | 0.05 | 4.00 | 0.04 | 3.96 | | 3.96 | | | 3.96 | |
| $C_4H_4$ | 1.0 | | 1.0 | | | 0.87 | 0.15 | 0.02 | 0.13 | | 0.13 | | | 0.13 | |
| $H_2O$ | 4.3 | | | 4.30 | | | | | | | 4.30 | 16.45 | | 20.75 | |
| DMF | | 4.3 | | 4.30 | 23.65 | 0.03 | 23.65 | 0.03 | 23.62 | 5.5 | 33.42 | | | 0.03 | 33.39 |
| Total | 992.9 | 4.3 | 988.48 | 8.72 | 25.88 | 985.43 | 30.00 | 1.07 | 28.93 | 5.5 | 43.15 | 16.45 | 157.40 | 183.61 | 33.39 |

Various modifications and alterations of the invention will become apparent to those skilled in the art without departing from the scope and spirit of this invention, and it should be understood that the foregoing discussion and accompanying drawing are not to be construed so as to unduly limit this invention.

I claim:

1. In a process for recovering acetylene from a gas stream containing the same and water, diacetylene, and heavier acetylenes, which comprises contacting said gas stream with a first stream of lean selective solvent to dehydrate the same, separating the resulting wet solvent from the resulting dehydrated gas stream, contacting the latter with acetylene-rich selective solvent to absorb diacetylene and part of said heavier acetylenes from said dehydrated gas stream, separating the resulting diacetylene-rich solvent from the resulting diacetylene-free gas stream, contacting the latter with a second stream of lean selective solvent to absorb acetylene and the remainder of said heavier acetylenes therefrom, stripping the resulting acetylene-rich solvent to obtain acetylene and heavy acetylenes and a third stream of lean solvent, combining a minor portion of said third stream of lean solvent with said wet solvent and said diacetylene-rich solvent, heating the combined solvent stream, and stripping the heated combined solvent stream to remove water, diacetylene, and heavier acetylenes from said solvent.

2. In a process for recovering acetylene from a gas stream containing the same and water, diacetylene, and heavier acetylenes, which comprises contacting said gas stream with a first stream of lean selective solvent to dehydrate the same, separating the resulting wet solvent from the resulting dehydrated gas stream, contacting the latter with acetylene-rich selective solvent to absorb diacetylene and part of said heavier acetylenes from said dehydrated gas stream, separating the resulting diacetylene-rich solvent from the resulting diacetylene-free gas stream, contacting the latter with a second stream of lean selective solvent to absorb acetylene and the remainder of said heavier acetylenes therefrom, stripping the resulting acetylene-rich solvent to obtain acetylene and heavy acetylenes, and a third stream of lean solvent, combining a minor portion of said third stream of lean solvent with said wet solvent and said diacetylene-rich solvent, heating the combined solvent stream, stripping the heated combined solvent stream to remove water, diacetylene, and heavier acetylenes from said solvent, and combining the resulting fourth stream of lean solvent with a major portion of said third stream of lean selective solvent.

3. The process according to claim 1 wherein said selective solvent is dimethylformamide.

4. In a process for recovering acetylene from a gas stream containing the same and water, diacetylene, and heavier acetylenes, which comprises contacting said gas stream with a first stream of lean selective solvent to dehydrate the same, separating the resulting wet solvent from the resulting dehydrated gas stream, contacting the latter with acetylene-rich selective solvent to absorb diacetylene and part of said heavier acetylenes from said dehydrated gas stream, utilizing a minor portion of the resulting acetylene-rich solvent in said diacetylene absorption step, separating the resulting diacetylene-rich solvent from the resulting diacetylene-free gas stream, contacting the latter with a second stream of lean selective solvent to absorb acetylene and the remainder of said heavier acetylenes therefrom, stripping the major portion of said resulting acetylene-rich solvent to obtain acetylene and heavy acetylenes, and a third stream of lean solvent, combining a minor portion of said third stream of lean solvent with said wet solvent and said diacetylene-rich solvent, heating the combined solvent stream, and stripping the heated combined solvent stream to remove water, diacetylene, and heavier acetylenes from said solvent.

5. In a process for recovering acetylene from a gas stream containing the same and water, diacetylene, and heavier acetylenes, which comprises contacting said gas stream with a first stream of lean selective solvent to dehydrate the same, separating the resulting wet solvent from the resulting dehydrated gas stream, contacting the latter with acetylene-rich selective solvent to absorb diacetylene and part of said heavier acetylenes from said dehydrated gas stream, utilizing a minor portion of the resulting acetylene rich solvent in said diacetylene absorption step, heating said diacetylene rich solvent and flashing the same, passing the resulting acetylene overhead back to said diacetylene absorption step, contacting the latter with a second stream of lean selective solvent to absorb acetylene and the remainder of said heavier acetylenes therefrom, stripping the resulting acetylene-rich solvent to obtain acetylene and heavy acetylenes, and a third stream of lean solvent, combining a minor portion of said third stream of lean solvent with said wet solvent and said diacetylene-rich solvent, heating the combined solvent stream, and stripping the heated combined solvent stream to remove water, diacetylene, and heavier acetylenes from said solvent.

6. In a process for recovering acetylene from a gas stream containing the same and water, carbon dioxide, diacetylene, and heavier acetylenes, which comprises contacting said gas stream with a first stream of lean selective solvent to dehydrate the same, separating the resulting wet solvent from the resulting dehydrated gas stream, contacting the latter with acetylene-rich selective solvent to absorb diacetylene and part of said heavier acetylenes from said dehydrated gas stream, utilizing a minor portion of the resulting acetylene-rich solvent in said diacetylene absorption step, separating the resulting diacetylene-rich solvent from the resulting diacetylene-free gas stream, contacting the latter with a second stream of lean selective solvent to absorb acetylene and the remainder of said heavier acetylenes therefrom, stripping the carbon dioxide from the major portion of said resulting acetylene rich solvent, stripping said major portion of said resulting acetylene-rich solvent to obtain acetylene and heavy acetylenes, and a third stream of lean solvent, combining a minor portion of said third stream of lean solvent with said wet solvent and said diacetylene-rich solvent, heating the combined solvent stream, and stripping the heated combined solvent stream to remove water, diacetylene, and heavier acetylenes from said solvent.

References Cited in the file of this patent

UNITED STATES PATENTS 2,891,633     Morro et al. _____ June 23, 1959